July 15, 1958     E. C. LILLY     2,842,870
EDUCATIONAL APPARATUS

Filed Sept. 28, 1953     2 Sheets-Sheet 1

Edith C. Lilly
INVENTOR.

July 15, 1958  E. C. LILLY  2,842,870
EDUCATIONAL APPARATUS
Filed Sept. 28, 1953  2 Sheets-Sheet 2

Edith C. Lilly
INVENTOR.

BY *Clarence A. O'Brien*
*and Harvey B. Jacobson*
Attorneys

United States Patent Office 2,842,870
Patented July 15, 1958

2,842,870

EDUCATIONAL APPARATUS

Edith C. Lilly, Newberg, Oreg.

Application September 28, 1953, Serial No. 382,570

3 Claims. (Cl. 35—31)

This invention relates to an educational apparatus for helping a child form clear and accurate concepts of numbers.

An object of this invention is to provide an educational apparatus having a receptacle with a number on the outer surface and a corresponding number of objects on the inner surface to teach the child the use of numbers.

Another object of this invention is to proivde an educational apparatus having indented numerals wherein a child receives a kinesthetic impression of the numbers thereby forming a clear concept of the shape of the numbers.

A further object of this invention is to provide an educational apparatus for use in teaching the unit numbers as well as the tens, as the child's education progresses.

Yet another object of this invention is to provide an educational device which is simple in construction, well adapted for the purposes intended and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
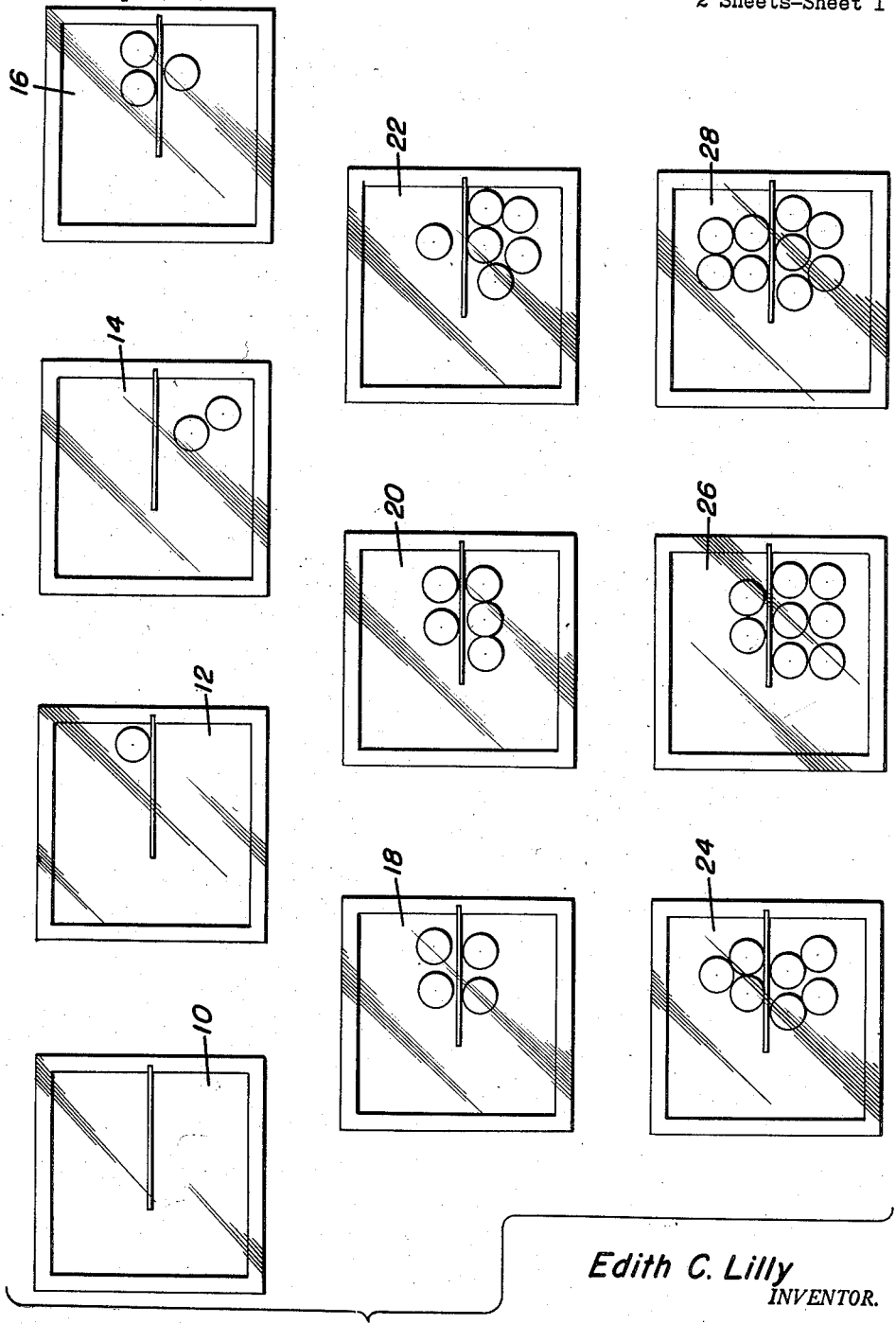
Figure 1 is a group showing of the educational apparatus, showing details of the construction of the unit integer teaching devices.

Referring now specifically to Figure 1, it will be seen that the educational apparatus of this invention includes a plurality of receptacles with the receptacle 10 representing "zero," the receptacle 12 representing the unit "1," the receptacle 14 representing the numeral "2," the receptacle 16 representing the numeral "3," the receptacle 18 representing the numeral "4," receptacle 20 representing numeral "5," receptacle 22 representing numeral "6," receptacle 24 representing numeral "7," receptacle 26 representing numeral "8," and receptacle 28 representing the numeral "9."

Figure 4:
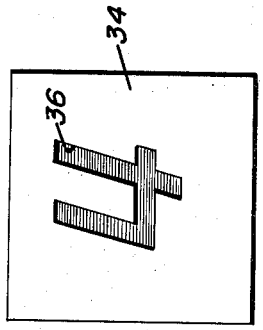
Figure 4 is an end view looking at the opposite end from Figure 2 and showing the numeral "4" indented on the end surface of the receptacle.
Figure 2:
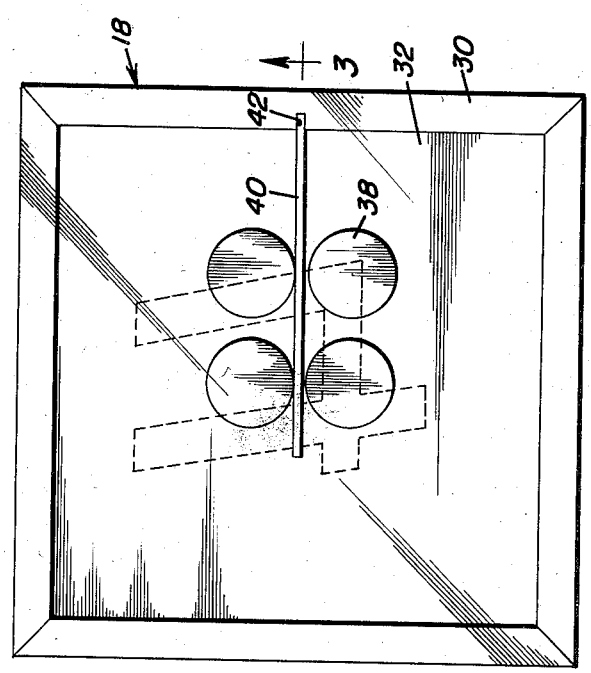
Figure 2 is an end view looking through the transparent window of the receptacle with the numeral "4" thereon.
Figure 3:
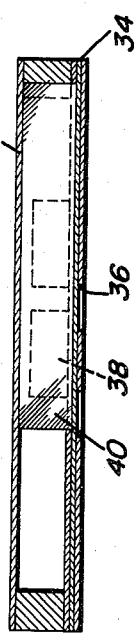
Figure 3 is a transverse, vertical section taken substantially along section line 3—3 of Figure 2, showing details of the partial partition and the location of the cylindrical disc.

Now referring specifically to Figures 2–4, the details of construction of one of the receptacles is shown. The receptacle 18 includes four side walls 30, a transparent end wall 32, and an opaque end wall 34. It will be noted that the end wall 34 is constructed of three pieces of veneer with the center piece of veneer being coated a dark color and the outer piece of veneering having a numeral such as the numeral "4," indicated by the reference character 36, cut out therefrom, thereby providing an indented outline for the numeral "4." Positioned between the end walls 32 and 34 are a plurality of cylindrical discs 38 which are shorter in length than the distance between the end walls 32 and 34 for sliding movement therebetween. A partial divider or partition 40 is secured to one of the side members 30 and projects laterally inwardly therefrom, thereby partially dividing the area between the end walls 34 and 32 into separate compartments. The divider 40 is secured to the end wall in a suitable slot 42 which rigidly positions the divider 40 and the side wall 30. Each of the receptacles of Figure 1 are constructed in the same manner except that the numerals 36 are different and the number of cylindrical discs 38 correspond to the number on the end 34 of the receptacle. The devices are made of such a size as to be easily handled by a child, and large enough for the numerals to receive a child's finger wherein the child will get a kinesthetic impression of the shape and curvature of the numerals, and by reversing the receptacles, the child will associate the kinesthetic impression of the numeral with the number of objects thereby assuring a clear concept of the numbers to the child. The partition 40 enables the child to arrive at a clear concept of the relationship between the various numbers and the functions of adding and subtracting or dividing, depending upon the progression of the child.

Figure 5:
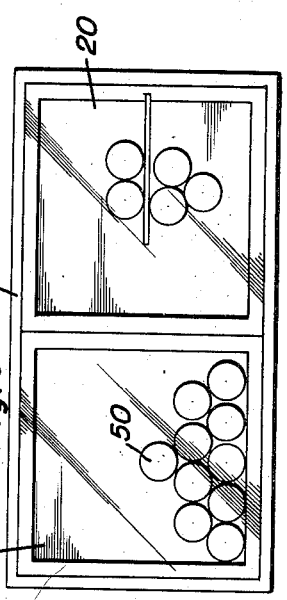
Figure 5 is an end view of a device used in teaching children the tens integers, showing details of the transparent window.
Figure 6:
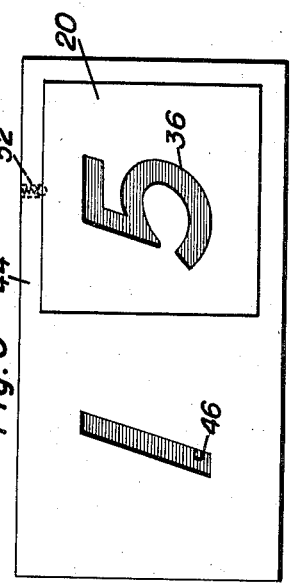
Figure 6 is a view similar to Figure 4, showing the particular number taught in Figure 5.

Referring now specifically to Figures 5 and 6, it will be seen that a frame member 44 is provided with a numeral 46 on one side thereof and a transparent window 48 on the other side thereof which forms the left hand side of the frame 44. The numeral 46 denotes a tens integer and the device is provided with a number of objects 50 therein which is equal to the tens integer on the face of the frame 44. In the specific embodiment illustrated, the numeral 46 represents "10" and there are ten objects 50 placed in the interior of the receptacle behind the transparent window. The right hand portion of the frame 44 receives selective receptacles such as the receptacle 20 having the numeral "5" thereon with five objects therein for viewing through the usual transparent window. The receptacle 20 is held within the frame 44 by a suitable spring loaded detent 52 which frictionally holds the receptacle 20 in position and which readily releases the receptacle 20 upon a slight upward pressure. As will be understood any of the receptacles of Figure 1 may be employed in the right hand side of the frame 44 thereby teaching a child the numbers from ten to nineteen, and as the education of the child progresses, the frame 44 may be substituted with the frame with the tens integer "2" thereon, thereby teaching the child twenties, and the same procedure may be used in teaching the child the rest of the numbers. This combination of kinesthetic impression and sight impression forms a clear concept in the child's mind of the numbers and the relation between numbers and how the numbers are formed. Obviously, when the teaching process first begins, the receptacles shown in Figure 1 are all that are necessary and as the teaching process progresses, various combinations using the principles of Figures 5 and 6 may be employed for teaching the child more complicated numbers. Obviously, the device may be used in teaching addition, subtraction, and division, employing the feeling, sight, and the play instinct to teach the child correct number concepts in a situation where it is not possible to have an erroneous solution. The partition enables the child to make all possible combinations of the objects placed therein so that a complete analysis of each digit is inevitable. The discs are usually colored a bright color which will intrigue the child and he discovers for himself that 7 is 3 plus 4, or 2 plus 5, or 1 plus 6. He also receives the correct subtraction concept, that is, of dividing any number into two groups only one of which is known, and he is not confused by the old subtraction idea that one of the groups must always be entirely removed. With the device of Figures 5 and 6, the child is clearly taught the units and tens relationship upon which our number system is based. The particular embodiment as disclosed is constructed of wood and Plexiglas, however, the idea could just as well be worked out in plastics, or other suitable materials. The device can be colored any suitable color which is intriguing and pleasing to the senses of a child, and constructed with strength to withstand the usual rough handling given to a device by small children.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An educational apparatus for teaching information concerning numbers comprising a closed receptacle, an enlarged transparent panel in said receptacle, an indented numeral on the external surface of the receptacle, said numeral being defined by a groove of sufficient width to receive the finger of a person so that the shape of the numeral may be felt and observed for teaching the manner of forming the numeral, a plurality of objects movably disposed in said receptacle, each object having one dimension generally equal to the dimension of the receptacle extending perpendicularly from said transparent panel, said objects being shaped to permit the objects to be stacked for easy observation and enumeration of the objects through the transparent panel, said objects being equal in quantity to the numeral on said receptacle for visually associating the quantity of objects with the numeral.

2. The combination of claim 1 wherein said receptacle is provided with a partial partition for dividing the interior thereof into separate areas, said partition being perpendicular to the transparent panel for observation of each area, said objects being movable for selective positioning in areas whereby any possible combination of integers totaling the numeral on the receptacle may be visually demonstrated.

3. The combination of claim 1 wherein a frame is provided for removably supporting said receptacle, said frame including a stationary receptacle having a numeral indented therein representing a tens integer, a transparent panel in said stationary receptacle, a plurality of objects within said stationary receptacle equal to the quantity designated by the tens integer, said objects in the stationary receptacle being identical in shape and size to the objects in the removable receptacle, said removable receptacle being disposed to the right of the stationary receptacle whereby the numeral thereon represents a unit integer.

References Cited in the file of this patent

UNITED STATES PATENTS

| | | |
|---|---|---|
| 690,446 | Levy | Jan. 7, 1902 |
| 1,228,391 | Barr et al. | June 5, 1917 |
| 2,502,238 | Wade et al. | Mar. 28, 1950 |
| 2,524,548 | Speirs | Oct. 3, 1950 |

FOREIGN PATENTS

| | | |
|---|---|---|
| 5,008 | Great Britain | 1900 |